US007193846B1

(12) United States Patent
Davis et al.

(10) Patent No.: US 7,193,846 B1
(45) Date of Patent: Mar. 20, 2007

(54) CPU FAN ASSEMBLY

(75) Inventors: David R. Davis, Sioux City, IA (US); Michael R. Flannery, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 86 days.

(21) Appl. No.: 10/034,110

(22) Filed: Dec. 26, 2001

Related U.S. Application Data

(63) Continuation of application No. 09/299,305, filed on Apr. 26, 1999, now Pat. No. 6,356,435.

(51) Int. Cl.
*G06F 1/20* (2006.01)
(52) U.S. Cl. .................. 361/687; 361/695; 361/714
(58) Field of Classification Search ........ 361/686–697, 361/671–674, 709, 710, 715–722, 724–727, 361/679–681, 683, 707, 714, 701–704
See application file for complete search history.

(56) References Cited

U.S. PATENT DOCUMENTS

| 5,297,005 | A | | 3/1994 | Gourdine ................... 361/697 |
| 5,881,298 | A | | 3/1999 | Cathey .................. 395/750.06 |
| 6,023,412 | A | * | 2/2000 | Morita ....................... 361/690 |
| 6,175,490 | B1 | * | 1/2001 | Papa et al. .................. 361/686 |
| 6,185,097 | B1 | * | 2/2001 | Behl ........................... 361/695 |

* cited by examiner

*Primary Examiner*—Yean-Hsi Chang
(74) *Attorney, Agent, or Firm*—Ross F. Hunt, Jr.; Stiles & Harbison PLLC

(57) ABSTRACT

An apparatus and method for cooling heat generating components within a compartment are disclosed. A cooling assembly isolates heat produced by a processor in a personal computer ("PC") system and exhausts it from the PC prior to adversely affecting other components within the PC. A fan causes air to blow across the processor having an attached heat sink disposed within the cooling assembly, and the air exits the cooling assembly without adversely affecting the other components surrounding the processor. In one example, an alternative passage is provided for the air.

17 Claims, 4 Drawing Sheets

CPU FAN ASSEMBLY

RELATED APPLICATION

This application is a continuation of U.S. application Ser. No. 09/299,305, filed Apr. 26, 1999 now U.S. Pat. No. 6,356,435, which application is incorporated herein by reference.

FIELD OF THE INVENTION

The present invention relates generally to computers. More particularly, it pertains to an assembly for dissipating heat generated by the central processing units of computers.

BACKGROUND OF THE INVENTION

Advances in semiconductor technology are creating increasing heat dissipation problems in electronic components and computer systems. Because electronic components have a relatively large amount of electrical current flow within an extremely small area, the components generate a substantial amount of heat. As electronic components get smaller and more powerful, they generate more heat in a smaller, more confined area. One such component is the central processing unit ("CPU"). The effect of the heat generated is intensified by the close spacing of the components on printed circuit boards and the close spacing of printed circuit boards within electrical devices. The excess heat surrounding the components can reduce the overall life of the components. Excessive heat degrades system performance and reliability, and can cause system failure. As a result, heat dissipation methods and devices are critical in the electronics industry.

A variety of well-known methods and devices for dissipating heat are available. These include various finned heat sinks which dissipate heat from the surfaces of fins. The finned heat sinks are attached to the electronic component to be cooled and are often used in computer systems with electric fans that drive air over the fins to enhance their cooling effect. Some CPU manufacturers, as another example, recommend the use of active heat sinks attached to CPUs.

There has been extensive work in developing effective methods of dissipating heat from the heat generating components, such as the CPU. However, prior attempts to dissipate heat did not allow for very exact modeling of airflow and cooling capabilities within compartments containing such heat generating components.

SUMMARY OF THE INVENTION

The present invention is directed to an apparatus and method that allows for the isolation of heat generating components, such as the CPU, and the cooling of such components in such a manner that does not allow the heat generated by such heat generating components to affect adversely other components within the system.

One aspect of the present invention is directed to a CPU fan assembly (also referred herein to as "cooling assembly") comprising a passage, a fan, and a CPU module with an attached heat sink disposed within the cooling assembly. The air passes across the passage, blowing over the CPU module and heat sink, and exits the cooling assembly. Another aspect of the present invention is directed to a method that includes the steps of drawing air into a cooling assembly containing a CPU with an attached heat sink, passing the air over the heat sink, and directing the air outside the cooling assembly.

One advantage of the present invention is the isolation of heat generating components so as not to allow the heat generated by such components to adversely affect other components within the system. This isolation can prevent the reduction of overall life of such components resulting from excessive heat. Another advantage is the prevention of degradation of system performance and reliability resulting from excessive heat. Moreover, the present invention obviates the need for using an active heat sink. In other words, with the present invention, the same cooling or better results can be achieved with the use of passive heat sinks. Also, because passive heat sinks are less expensive than active heat sinks, lower costs can be achieved with the present invention.

Still other and further aspects, advantages, and embodiments will be described in the detailed description of the preferred embodiments with reference to the accompanying drawings.

DETAILED DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
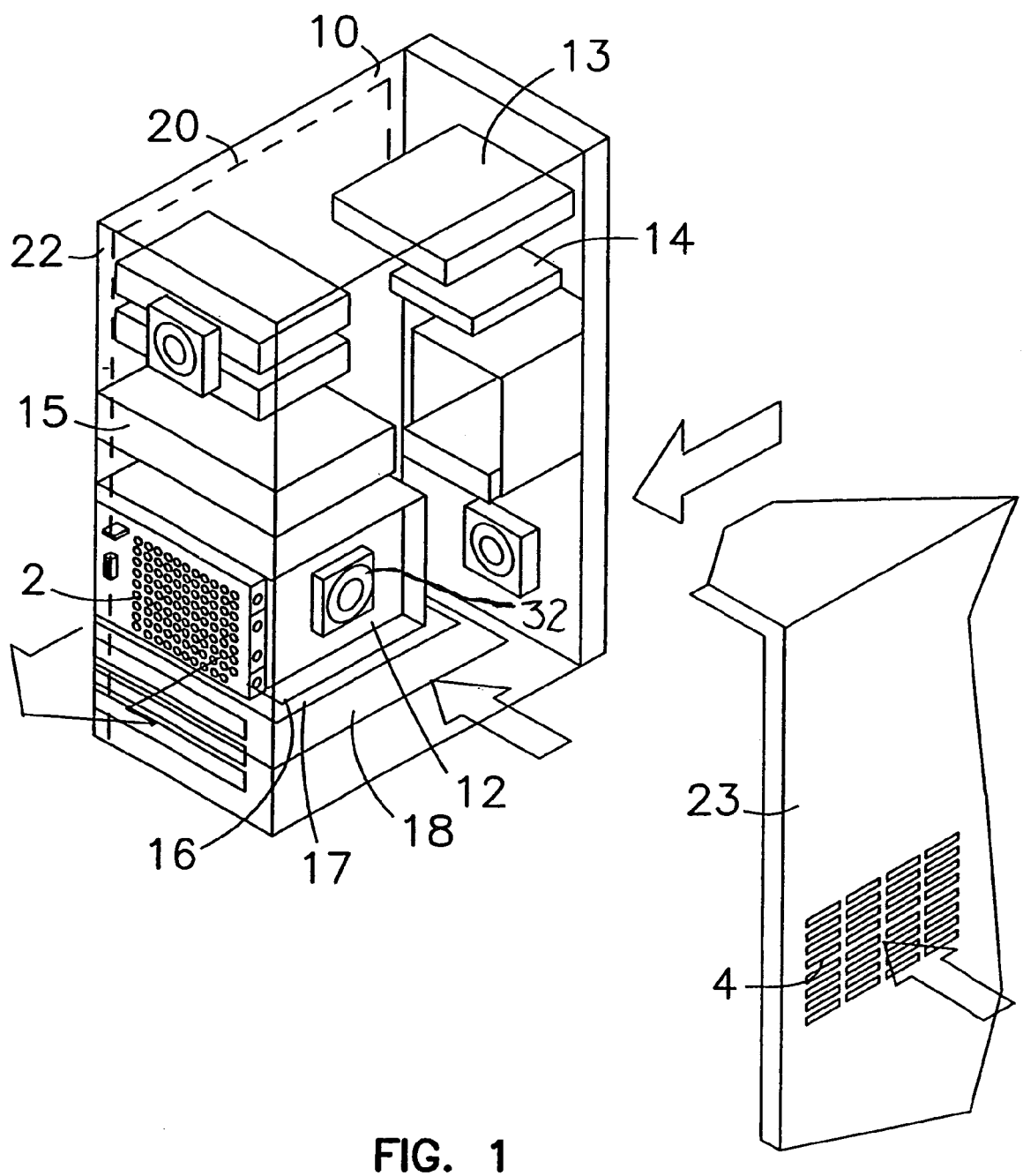
FIG. 1 is a perspective view of a computer case having disposed therein a cooling assembly constructed in accordance with the present invention.

FIG. 1 is a perspective view of a computer case 10 having disposed therein a cooling assembly 12. As shown in FIG. 1, computer case 10 contains therein various other computer components such as, for example, CD-ROM 13, floppy drive 14, power supply 15, motherboard 16, video card 17, and at least one input/output card 18. Computer case 10 comprises computer case walls 20, 22, and 23. Computer case wall 22 has a plurality of exhaust holes 2 thereon that are aligned with cooling assembly 12. Computer case wall 23 has a plurality of inlet holes 4 thereon that are aligned with cooling assembly 12.

Figure 2:
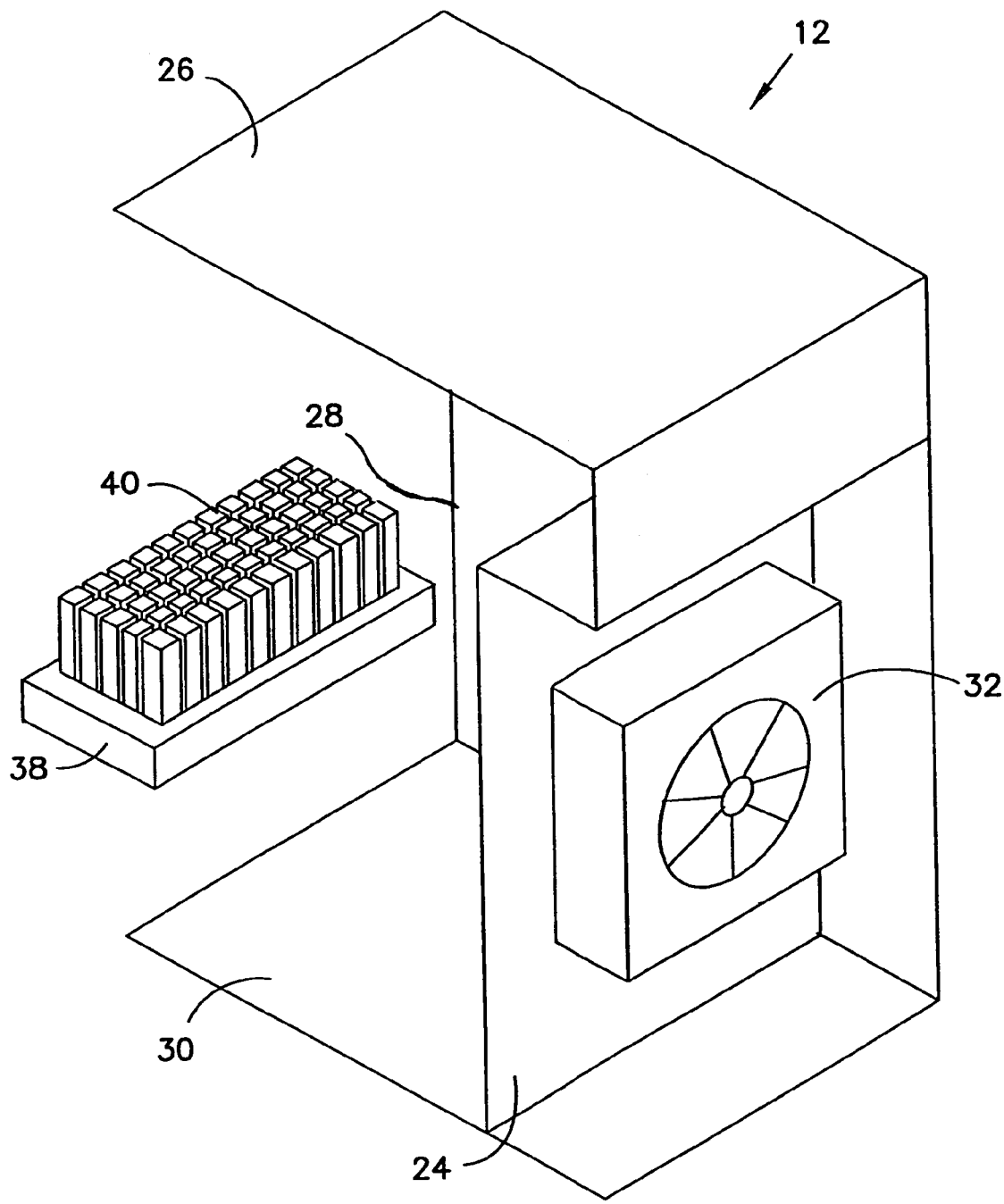
FIG. 2 is a perspective view of the cooling assembly of FIG. 1.

FIG. 2 is a perspective view showing cooling assembly 12 in more detail. Cooling assembly 12 is an apparatus having cooling assembly walls 24, 26, 28, and 30. Cooling assembly wall 24 supports fan 32. Disposed within cooling assembly 12 are CPU module 38 with attached heat sink 40.

Although CPU manufacturers such as Intel recommend the use of heat sinks actively moving air over the heat sink for CPUs such as the Klamath®, for example, in this embodiment, heat sink 40 is a passive heat sink, instead of an active heat sink. The use of a passive heat sink results in a lower cost than the use of an active heat sink. Further, the use of this embodiment results in better cooling of the CPU than the use of only active heat sinks. Moreover, although FIG. 2 shows only one CPU module 38, cooling assembly 12 may be used to cool more than one CPU.

Referring to FIGS. 1 and 2, cooling assembly 12 essentially encloses or isolates (with computer case wall 20 and cooling assembly walls 26, 28, and 30) at least one CPU module 38 with attached heat sink 40 from the other components on board 16, such as video card 17 and input/output card 18. Also, as so disposed within computer case 10, the walls of cooling assembly 12 essentially comprises, in addition to cooling assembly walls 24, 26, 28, and 30, computer case wall 20, computer case wall 22, and computer case wall 23, the volume within which is adapted to contain CPU module 38 having at least one heat sink 40 attached thereto.

During operation of cooling assembly 12, fan 32 draws air from outside of cooling assembly 12 through inlet holes 4 of computer case wall 23, and the air is blown across the heat sink 40 attached to the CPU module 38 disposed within cooling assembly 12. Because computer case wall 20 and cooling assembly walls 26, 28, and 30 essentially enclose or isolate CPU module 38 and heat sink 40, the air is forced to exit through exit holes 2 of computer case wall 22. By way of example, but not by way of limitation, the path from inlet holes 4 of computer case wall 23 to exit holes 2 of computer case wall 22 defines a passage which the air travels within cooling assembly 12. It is preferable that a significant amount of the air drawn from the outside of cooling assembly 12 is exhausted to the outside of computer case 10. In one embodiment, at least approximately 80 percent of the air drawn from the outside of computer case 10 is exhausted to the outside of computer case 10. It is important, however, that a significant amount of the air heated by heat sink 40 is exhausted by a path that minimizes heating of other heat-sensitive components. The isolating walls of assembly 12 serve to substantially restrict processor heat from reaching the other internal components of the computer such as video card 17, power supply 15, hard drives, and the like.

FIGS. 1 and 2 depict the air being drawn from outside of cooling assembly 12 as also coming from outside of computer case 10. However, in another embodiment of the present invention (not shown), where, for instance, computer case wall 23 did not have inlet holes 4, fan 32 during operation draws air from inside computer case 10. Such an embodiment is still within the scope of the present invention.

Alternatively, the direction of fan 32 can be reversed from the operation as described above so that air is drawn from outside computer case 10 through outlet holes 2. The air is then blown across heat sink 40 attached to CPU module 38 disposed within cooling assembly 12. The air is finally forced to exit through inlet holes 4 of computer case wall 23.

The use of computer case wall 20 and cooling assembly walls 26, 28, and 30 to generally isolate CPU module 38 having the attached heat sink 40 is meant to be illustrative, not restrictive. For example, the use of a cylindrical assembly to enclose or isolate CPU module 38 having the attached heat sink 40 is within the spirit of the present invention.

Figure 3:
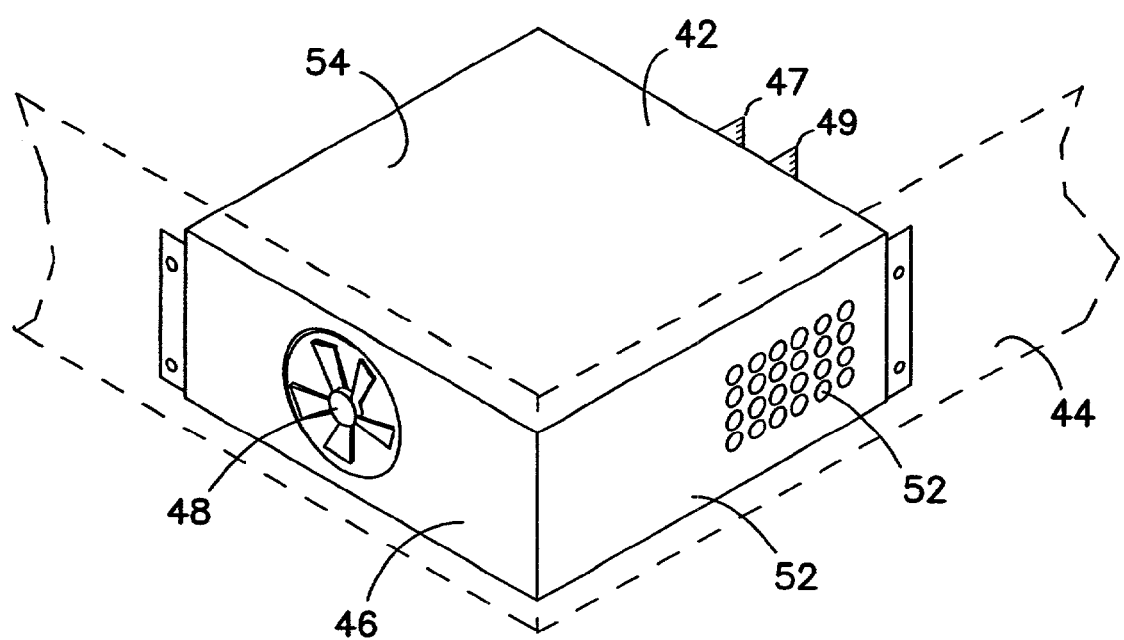
FIG. 3 depicts a cooling assembly as a portion of a computer case.

FIG. 3 shows yet another embodiment of the present invention, wherein cooling assembly 42 forms a separately detachable portion of computer case 44. This embodiment permits the installation of cooling assembly 42 without the need for opening computer case 44. Cooling assembly 42 is an apparatus having cooling assembly wall 46 supporting a fan 48 passing therethrough and cooling assembly wall 50 having exhaust holes 52. Cooling assembly 42 further has cooling assembly wall 54, which, along with cooling assembly walls 46 and 50, isolates a CPU module and heat sink (not shown in FIG. 3) enclosed within cooling assembly 42. By way of operation, fan 48 draws air from outside of computer case 44, blows it across the CPU module and heat sink enclosed within cooling assembly 42, and forces it through exhaust holes 52 on cooling assembly wall 50. The path between fan 48 and exhaust holes 52 defines the passage within which the air moves while the fan is in operation. In an alternative embodiment, fan 48 can draw air from outside of computer case 44 through exhaust holes 52 and exhaust the air through fan 48 on cooling assembly wall 46.

In one embodiment, assembly 42, which may also be referred to as a processor assembly, is detachable from the computer case 44 without opening the case 44. In this embodiment, a processor and an associated heat sink may be placed in the processor assembly 42 along with fan 48. Assembly 42 may be configured to specifically fit a certain processor. For example, some processors and heat sinks may require more or less space for connection and placement. The processor assembly 42 may be tailored for a specific processor and heat sink within the confines of the size of the assembly 42.

In this embodiment, the assembly 42 is provided with connections to connect a processor to the case and motherboard via a processor module connector 49, and to connect the fan 48 to the power supply for the computer, located within computer case 44. Power connection 47 allows fan 48 to be connected to the computer power supply when the assembly 42 is positioned within the case 44. Similarly, processor module connector 49 allows the processor to be connected to power when the assembly 42 is positioned within the case 44. In this manner, the processor assembly 42 may be separately detachable from the computer case 44, and may be individually conformed to the specific processor desired. Assembly 42 is part of case 44 in one embodiment. In another embodiment, assembly 42 may connect to case 44 at a connection location determined by the power connection required between assembly 42 and the computer power supply within case 44.

The operation of assembly 42, with its fan 48 and processor with heat sink, may be tuned to the specific needs of the processor and heat sink placed within the assembly 42. A specific thermal cooling system designed for the specific processor in the assembly 42, with a common fan power connection 47. Similarly, shielding from external electromagnetic (EM) interference and sealing from internal EM interference may be optimized for electromagnetically isolating the system and heat sink within the assembly 42.

Preferably, the air that is drawn from outside computer case 44 and that is blown across the CPU module and heat sink should not mix with air that is within computer case 44 but outside cooling assembly 42. In other words, it is preferable that all the air drawn from the outside of computer case 44 is exhausted to the outside of computer case 44. However, it is also acceptable if at least 80 percent of the air drawn from the outside of computer case 44 is exhausted to the outside of computer case 44.

Figure 4B:
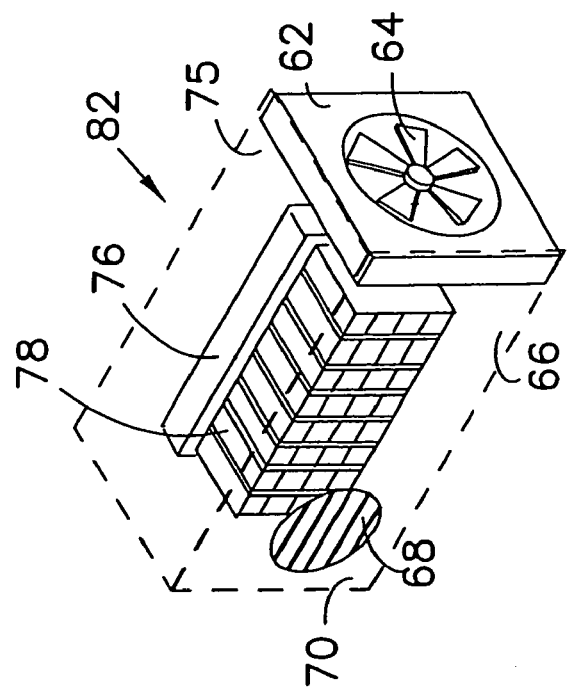
FIG. 4B shows another alternative cooling assembly in another embodiment of the present invention.
Figure 4A:
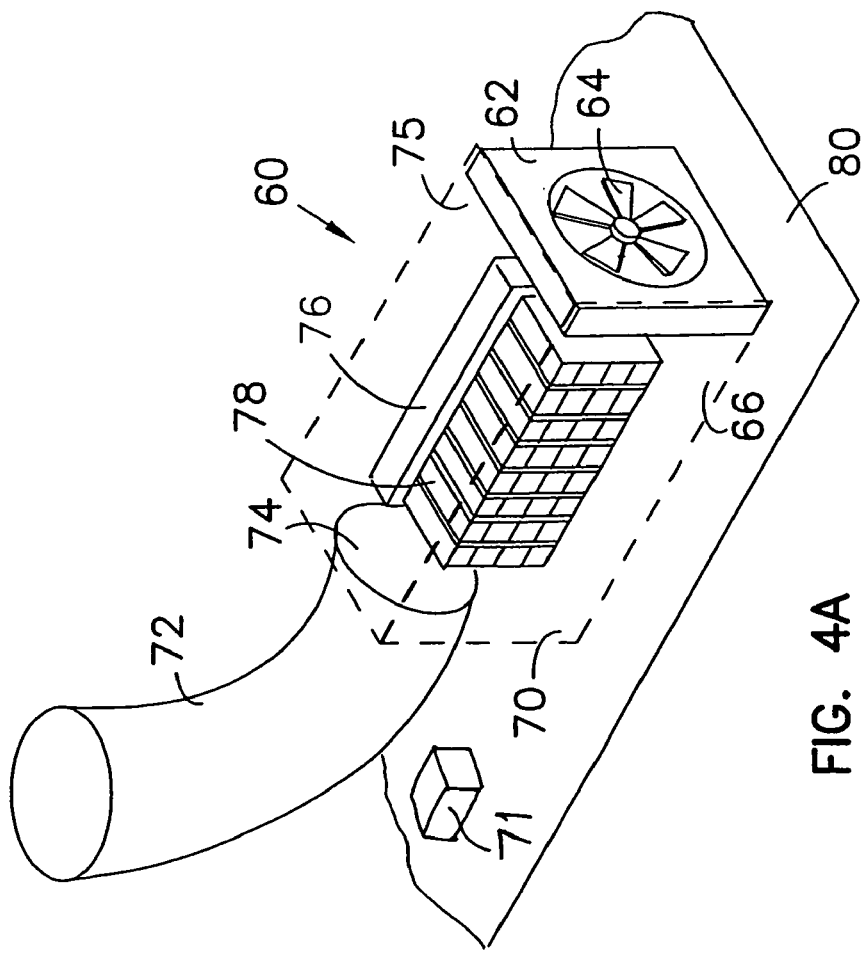
FIG. 4A shows an alternative cooling assembly in another embodiment of the present invention.

FIG. 4A shows a cooling assembly, also referred to as an isolating assembly, with an alternate passage as another embodiment of the present invention. Cooling assembly 60 is disposed within a computer case (not shown), and comprises cooling assembly wall 62 with fan 64, cooling assembly wall 66, cooling assembly wall 70 in communication with duct 72 through opening 74, and cooling assembly wall 75. Disposed within cooling assembly 60 are CPU module 76 with an attached heat sink 78. Cooling assembly walls 62, 66, 70, and 75 of isolation assembly 60 generally isolate heat generated from CPU module 76 with attached heat sink 78 from any other components, indicated by component 71, that are mounted on board 80. Heat sink 78 is a passive heat sink, instead of an active heat sink. As previously noted, the use of a passive heat sink results in a lower cost than the use of an active heat sink. Further, the use of this embodiment results in better cooling of the CPU than the use of only active heat sinks. Moreover, although FIG. 4A shows only one CPU module 76 with attached heat sink 78, cooling assembly 60 may be used to cool more than one CPU.

A second passage in which the air travels is from opening 74 on cooling assembly wall 70, across CPU module 76 and heat sink 78, and out through fan 64 on cooling assembly wall 62. This is referred to as a second passage because another passage is defined outside of isolation assembly 60 through which air is, e.g., drawn into the computer case (not shown) by a fan such as one or more of the unnumbered fans of FIG. 1.

The use of cooling assembly walls 62, 66, 70, and 75 to generally isolate CPU module 76 and heat sink 78 is meant to be illustrative, not restrictive. For example, the use of a cylindrical assembly to enclose or isolate CPU module 76 and heat sink 78 is within the scope of the present invention.

Preferably, the air that is drawn from outside of the computer case that contains cooling assembly 60 and that is blown across CPU module 76 and heat sink 78 should not mix with air in the first passage that is within the computer case but outside of isolation or cooling assembly 60.

In other words, it is preferable that all the air drawn from the outside of the computer case is exhausted to the outside of the computer case. In one embodiment, at least 80 percent of the air drawn from the outside of the computer case is exhausted to the outside of the computer case, although other percentages are contemplated.

In an alternative embodiment 82 shown in FIG. 4B, fan 64 draws air from inside cooling assembly 60 during operation and blows the air across fan 64 through cooling assembly wall 62. A first passage in which the air travels is from opening 68 on cooling assembly wall 66, across CPU module 76 and heat sink 78, and out through fan 64 on cooling assembly wall 62. Alternatively, fan 64 (operated in reverse of what is described above) draws air from outside of cooling assembly 60 through cooling assembly wall 62, blows the air across CPU module 76 and heat sink 78, and forces the air out through slits 68 on cooling assembly wall 66 and opening 74 on cooling assembly wall 70.

It is to be understood that the alternate passages, i.e., the first passage and second passage, are depicted in FIGS. 4A and 4B to illustrate that the passage in which air travels across CPU module 76 and attached heat sink 78 need not be a particular path. In other words, the air may travel in an essentially curved path across CPU module 76 and heat sink 78, such as, for example, the first passage. Alternatively, the air may travel in an essentially straight path across CPU module 76 and heat sink 78, such as, for example, the second passage. It is within the scope of this invention for cooling assembly 60 to comprise both first and second passages in an embodiment.

As can be seen, one advantage provided by the present invention is the isolation of heat generating components, such as the CPU, so as not to allow the heat generated by such components to adversely affect other components within the system. As previously noted, this isolation can prevent the reduction of overall life of such components resulting from excessive heat. A further advantage is the prevention of degradation of system performance and reliability resulting from excessive heat. Also, an active heat sink need not be used. In other words, a passive heat sink may be used with this present invention, thereby lowering the cost of dissipating heat generated by the CPU.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A cooling assembly for at least one board, the at least one board having mounted thereon a plurality of components including a first component and a further component, the cooling assembly comprising:
   a first passage;
   a first fan for passing air through the passage;
   an isolation assembly for generally enclosing heat generated from the first component, the first component mounted on the at least one board being enclosed within the isolation assembly, the isolation assembly containing at least a part of the first passage, and the isolation assembly being removably attachable to a computer case without opening the computer case;
   the further component being mounted on the at least one board outside of said isolation assembly and outside of any other isolation assembly;
   a further passage configured to provide air flow past the further component mounted on the at least one board outside of the isolation assembly; and
   a second fan for passing air through the further passage,
   said first component comprising a processor having a passive heat sink operably coupled thereto.

2. The cooling assembly of claim 1, wherein the first passage includes a conduit, separate from the first and second fans and separate, at least in part, from the isolation assembly, in communication with the isolation assembly.

3. The cooling assembly of claim 1, wherein the plurality of components are enclosed within a case, and the air is drawn from outside the case.

4. The cooling assembly of claim 1, wherein the plurality of components are enclosed within a case, and the air is drawn from within the case.

5. The cooling assembly of claim 1, wherein the isolation assembly is configured to shield the first component from an amount of electromagnetic interference.

6. The cooling assembly of claim 1, further comprising:
   an exhaust hole in communication with the first passage and suitable for venting air through the computer case.

7. The cooling assembly of claim 6, wherein an air path from the first fan through the exhaust hole passes through the first passage.

8. The cooling assembly of claim 6, wherein the cooling assembly is configured such that at least 80% of the air passing through the first fan is vented through the exhaust hole.

9. The cooling assembly of claim 6, wherein the cooling assembly is configured such that substantially all of the air passing through the first fan is vented through the exhaust hole.

10. A cooling assembly for at least one board, the at least one board having mounted thereon a plurality of components including a first component and a further component, the cooling assembly comprising:

a first passage;

a first fan for passing air through the passage;

an isolation assembly for generally enclosing heat generated from the first component, the first component mounted on the at least one board being enclosed within the isolation assembly, and the isolation assembly containing at least a part of the first passage;

the further component being mounted on the at least one board outside of said isolation assembly and outside of any other isolation assembly;

a further passage configured to provide air flow past the further component mounted on the at least one board outside of the isolation assembly; and a second fan for passing air through the further passage said first component comprising a processor having a passive heat sink operably coupled thereto.

11. The cooling assembly of claim 10, wherein the alternate passage includes a conduit, separate from said first and second fans and separate, at least in part, from the isolation assembly, in communication with the isolation assembly.

12. The cooling assembly of claim 10, wherein the plurality of components are enclosed within a case, and the air is drawn from outside the case.

13. The cooling assembly of claim 10, wherein the isolation assembly is configured to shield the first component from an amount of electromagnetic interference.

14. The cooling assembly of claim 10, further comprising:

an exhaust hole in communication with the first passage and suitable for venting air through the computer case.

15. The cooling assembly of claim 14, wherein an air path from the first fan through the exhaust hole passes through the first passage.

16. The cooling assembly of claim 14, wherein the cooling assembly is configured such that at least 80% of the air passing through the first fan is vented through the exhaust hole.

17. The cooling assembly of claim 14, wherein the cooling assembly is configured such that substantially all of the air passing through the first fan is vented through the exhaust hole.

* * * * *